US011727729B2

(12) United States Patent
Mettyear

(10) Patent No.: US 11,727,729 B2
(45) **Date of Patent: *Aug. 15, 2023**

(54) SIGNATURE VERIFICATION APPARATUS, SYSTEM, METHOD, AND PROGRAM

(71) Applicant: Wacom Co., Ltd., Saitama (JP)

(72) Inventor: Nicholas Victor Mettyear, Salisbury (GB)

(73) Assignee: Wacom Co., Ltd., Saitama (JP)

( * ) Notice: Subject to any disclaimer, the term of this patent is extended or adjusted under 35 U.S.C. 154(b) by 62 days.

This patent is subject to a terminal disclaimer.

(21) Appl. No.: 17/396,520

(22) Filed: Aug. 6, 2021

(65) Prior Publication Data

US 2021/0365669 A1 Nov. 25, 2021

Related U.S. Application Data

(63) Continuation of application No. 16/591,180, filed on Oct. 2, 2019, now Pat. No. 11,106,892.

(30) Foreign Application Priority Data

Oct. 22, 2018 (JP) ................................ 2018-198334

(51) Int. Cl.
*G06V 40/30* (2022.01)
*G06V 30/414* (2022.01)

(52) U.S. Cl.
CPC ............ *G06V 40/30* (2022.01); *G06V 30/414* (2022.01); *G06V 40/376* (2022.01); *G06V 40/394* (2022.01)

(58) Field of Classification Search
CPC .. G06V 40/394; G06V 10/243; G06V 30/414; G06V 40/376; G06V 40/30
See application file for complete search history.

(56) References Cited

U.S. PATENT DOCUMENTS 9,235,748 B2 * 1/2016 Mettyear ............ G06V 30/2268
11,106,892 B2 * 8/2021 Mettyear ............. G06V 40/394
(Continued)

FOREIGN PATENT DOCUMENTS

EP 3 321 835 A1 5/2018

OTHER PUBLICATIONS

Extended European Search Report, dated Mar. 20, 2020, for European Application No. 19203292.8-1207, 11 pages.
(Continued)

*Primary Examiner* — Ming Y Hon
(74) *Attorney, Agent, or Firm* — Seed Intellectual Property Law Group LLP

(57) ABSTRACT

Disclosed herein is a signature verification apparatus including a first verification circuitry verifying a user's signature by comparing dynamic signature data indicating a change of a user's writing state over time during signing of his or her name by the user and reference data for dynamic signature, a second verification circuitry verifying the user's signature by comparing static signature data indicating a writing path during signing of his or her name by the user and reference data for static signature, and a data registration circuitry registering the reference data for dynamic signature and register the reference data for static signature. In a case where the reference data for static signature has yet to be registered by the data registration circuitry, the second verification circuitry verifies the user's signature by regarding static signature data generated from the reference data for dynamic signature already registered as the reference data for static signature.

12 Claims, 7 Drawing Sheets

(56) References Cited

U.S. PATENT DOCUMENTS

| | | | | |
|---|---|---|---|---|
| 2003/0088344 | A1* | 5/2003 | Oda | G05D 1/027<br>318/587 |
| 2003/0233557 | A1* | 12/2003 | Zimmerman | G06V 40/30<br>713/170 |
| 2004/0046991 | A1* | 3/2004 | Kim | G06F 3/1236<br>358/1.15 |
| 2008/0115981 | A1* | 5/2008 | Bechtel | G06F 3/03545<br>178/19.01 |
| 2012/0095958 | A1* | 4/2012 | Pereira | G06F 16/435<br>707/609 |
| 2015/0101043 | A1* | 4/2015 | Clifton | H04L 67/14<br>726/22 |
| 2015/0280921 | A1* | 10/2015 | Geoffrey | H04L 9/3247<br>713/176 |

OTHER PUBLICATIONS

Galbally et al., "On-line signature recognition through the combination of real dynamic data and synthetically generated static data," *Pattern Recognition 48*:2921-2934, 2015.

European Office Action, dated Mar. 10, 2022, for European Application No. 19 203 292.8-1207, 10 pages.

Hennebert et al., "A New Forgery Scenario Based on Regaining Dynamics of Signature," University of Fribourg, pp. 366-375, 2007.

* cited by examiner

DSV – POSITION, SLOPE, CURVATURE, PEN PRESSURE, TILT ANGLE
SSV – POSITION, SLOPE, CURVATURE

SIGNATURE VERIFICATION APPARATUS, SYSTEM, METHOD, AND PROGRAM

BACKGROUND

Technical Field

The present disclosure relates to a signature verification apparatus, system, method, and program.

Description of the Related Art

User's hand-written signature can be represented by using "static" signature data indicating a writing path or "dynamic" signature data indicating a change of a user's writing state over time.

U.S. Pat. No. 9,235,748, which is incorporated herein by reference in its entirety, discloses a signature verification system that verifies a user's signature by using dynamic signature data.

Incidentally, implementing two types of software components corresponding to the above signature data creates a need to selectively use software to suit the data type, thus resulting in reduced user convenience because of the need for selective use. For this reason, implementation of a general signature verification system (hereinafter also referred to as a GSV) is desired that can handle both pieces of signature data in a hybrid manner.

When a signature is verified by this GSV, it is necessary to have ready two types of reference data for each user. An example of a method of registering reference data would be to collect signature data each time the same user signs his or her name and select, from among the signature data, typical signature data, and register that data. Considering possible variation of handwriting, the larger the number of signature data samples, the more preferable in terms of verification accuracy.

In the future, as the number of cases of collecting dynamic signature data increases as a result of change in environments related to commercial transactions or change in practice, this will conversely lead to a situation in which static signature data is more difficult to collect. In this case, even if reference data for dynamic signature is registered first, as long as reference data for static signature remains unregistered, a problem of not being able to initiate verification of static signature data will arise.

BRIEF SUMMARY

One or more embodiments are directed to a signature verification apparatus, system, method, and program that permit a highly accurate verification process to be performed on static signature data even in the state in which reference data for static signature has yet to be registered.

A signature verification apparatus of a first aspect of the present disclosure includes: first verification circuitry configured to verify a user's signature by comparing dynamic signature data indicating a change of a user's writing state over time during signing of his or her name by the user and reference data for dynamic signature; second verification circuitry configured to verify the user's signature by comparing static signature data indicating a writing path during the signing of his or her name by the user and reference data for static signature, and data registration circuitry configured to register the reference data for dynamic signature on the basis of a plurality of pieces of dynamic signature data acquired from the same user and register the reference data for static signature on the basis of a plurality of pieces of static signature data acquired from the same user. In a case where the reference data for static signature has yet to be registered by the data registration circuitry, the second verification circuitry verifies the user's signature by regarding static signature data generated from the reference data for dynamic signature already registered as the reference data for static signature.

A signature verification system of a second aspect of the present disclosure includes the above signature verification apparatus and one or a plurality of signature terminals configured to permit input of the dynamic signature data or the static signature data in association with the user who signs his or her name.

A signature verification method of a third aspect of the present disclosure using one or a plurality of computers includes: verifying a user's signature by comparing dynamic signature data indicating a change of a user's writing state over time during signing of his or her name by the user and reference data for dynamic signature; verifying the user's signature by comparing static signature data indicating a writing path during the signing of his or her name by the user and reference data for static signature; and registering the reference data for dynamic signature on the basis of a plurality of pieces of dynamic signature data acquired from the same user and registering the reference data for static signature on the basis of a plurality of pieces of static signature data acquired from the same user. In a case where the reference data for static signature has yet to be registered, in the verifying the user's signature by comparing the static signature data indicating the writing path during the signing of his or her name by the user and the reference data for static signature, the user's signature is verified by regarding static signature data generated from the reference data for dynamic signature already registered as the reference data for static signature.

A signature verification program of a fourth aspect of the present disclosure for one or a plurality of computers includes: by first verification circuitry, verifying a user's signature by comparing dynamic signature data indicating a change of a user's writing state over time during signing of his or her name by the user and reference data for dynamic signature; by second verification circuitry, verifying the user's signature by comparing static signature data indicating a writing path during the signing of his or her name by the user and reference data for static signature; and, by data registration circuitry, registering the reference data for dynamic signature on the basis of a plurality of pieces of dynamic signature data acquired from the same user and registering the reference data for static signature on the basis of a plurality of pieces of static signature data acquired from the same user. In a case where the reference data for static signature has yet to be registered, in the verifying by the second verification circuitry, the user's signature is verified by regarding static signature data generated from the reference data for dynamic signature already registered as the reference data for static signature.

According to one or more embodiments of the present disclosure, it is possible to perform a highly accurate verification process on static signature data even in the state in which reference data for static signature has yet to be registered.

DETAILED DESCRIPTION

A description will be given below of a signature verification apparatus, system, method, and program of the present disclosure with reference to the accompanying drawings. It should be noted that the present disclosure is not limited to the embodiment and the modification example described below, and it is a matter of course that changes can be made freely to the present disclosure without departing from the gist of the present disclosure. Alternatively, respective configurations can be combined in an arbitrary manner as long as no technical inconsistency arises.

Configuration of the Signature Verification System 10

Overall Configuration

Figure 1:
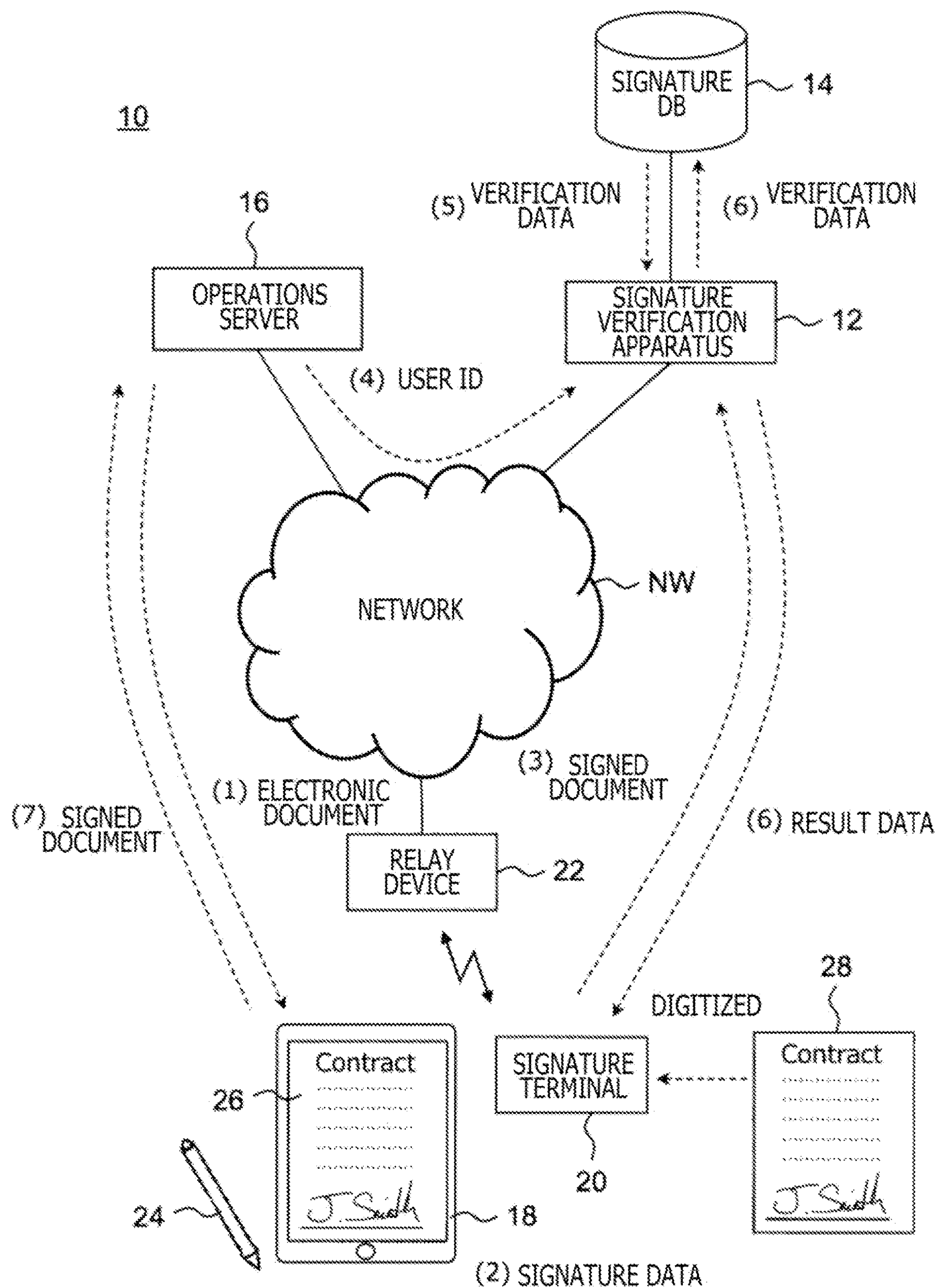
FIG. 1 is an overall configuration diagram of a signature verification system incorporating a signature verification apparatus in an embodiment of the present invention.

FIG. 1 is an overall configuration diagram of a signature verification system 10 incorporating a signature verification apparatus 12 in an embodiment of the present disclosure. The signature verification system 10 is a system capable of providing a service for verifying authenticity of a user's signature by performing a desired process on signature data indicating the signature. This signature verification system 10 includes the signature verification apparatus 12, a signature-related database (hereinafter referred to as a signature DB 14), an operations server 16, and signature terminals 18 and 20.

The signature verification apparatus 12 is a computer that performs integrated control related to signature verification and that is configured to be able to access the signature DB 14. The operations server 16 is a computer that supports operations (e.g., financial operations) requiring signature. The signature terminals 18 and 20 are pieces of electronic equipment configured to permit input of signature data in association with the user who signs his or her name.

The signature terminals 18 and 20 are connected to the signature verification apparatus 12 via a relay device 22 and a network NW in such a manner as to permit bidirectional communication. Similarly, the signature terminals 18 and 20 are connected to the operations server 16 via the relay device 22 and the network NW in such a manner as to permit bidirectional communication. This allows the signature terminals 18 and 20 to exchange data related to signature verification with the signature verification apparatus 12 or the operations server 16.

The signature terminal 18 is a piece of electronic equipment including, for example, a tablet terminal, a smartphone, or a personal computer. The user can write his or her own signature in a signature field of an electronic document 26 by holding a stylus 24 with one of his or her hands and moving a pen tip while pressing the pen tip against a touch surface.

The signature terminal 20 is, for example, a personal computer to which a printer and a scanner, not illustrated, are connected. The user performs printing with the printer, hand-writes his or her signature in the signature field of the printed document, and then reads the document with the scanner. This allows the signature terminal 20 to acquire scanned data of a paper document 28.

Overview of the Operation

An overview will be presented below of the operation of the signature verification system 10 with emphasis on electronic signature using the signature terminal 18.

(1) First, when accepting a request instruction from the signature terminal 18, the operations server 16 issues the unsigned electronic document 26 and sends, to the signature terminal 18, data including the electronic document 26 with an issuance identification (ID) attached thereto. As a result, the signature terminal 18 acquires the electronic document 26 by receiving the document via the network NW and the relay device 22. Here, the operations server 16 stores a user ID acquired from the signature terminal 18 and the above issuance ID in association with each other.

(2) When accepting user's writing operation using the stylus 24 while the electronic document 26 is displayed, the signature terminal 18 generates signature data indicating the user's signature. Then, the signature terminal 18 creates a "signed document," a combination of the electronic document 26 and the signature data.

(3) The signature terminal 18 sends, to the signature verification apparatus 12, data including the signed document created by itself. As a result, the signature verification apparatus 12 acquires the signed document and the issuance ID by receiving them via the relay device 22 and the network NW.

(4) When accepting an inquiry for ID from the signature verification apparatus 12, the operations server 16 provides, to the signature verification apparatus 12, the user ID corresponding to the issuance ID of the electronic document 26.

(5) The signature verification apparatus 12 acquires, from the signature DB 14, verification data 52 (FIG. 2) appropriate to the user ID and performs a verification process relates to authenticity of the signature included in the signed document. As a result, a signature verification result is acquired.

(6) The signature verification apparatus 12 sends, to the signature terminal 18, result data 54 (FIG. 2) indicating the signature verification result and provides update information of the verification data 52 to the signature DB 14.

(7) In the case where authenticity of the signature is verified by the signature verification apparatus 12, the signature terminal 18 sends, to the operations server 16, data including the signed document.

A contracting process involving electronic signature is complete as described above. On the other hand, in the case where a contracting process involving so-called analog signature is carried out, electronic scanned data produced from the paper document 28 is used. For this reason, although a signed document is created in a different manner, the procedure from (3) onward is basically the same as that described above.

Block Diagram of the Signature Verification Apparatus 12

Figure 2:
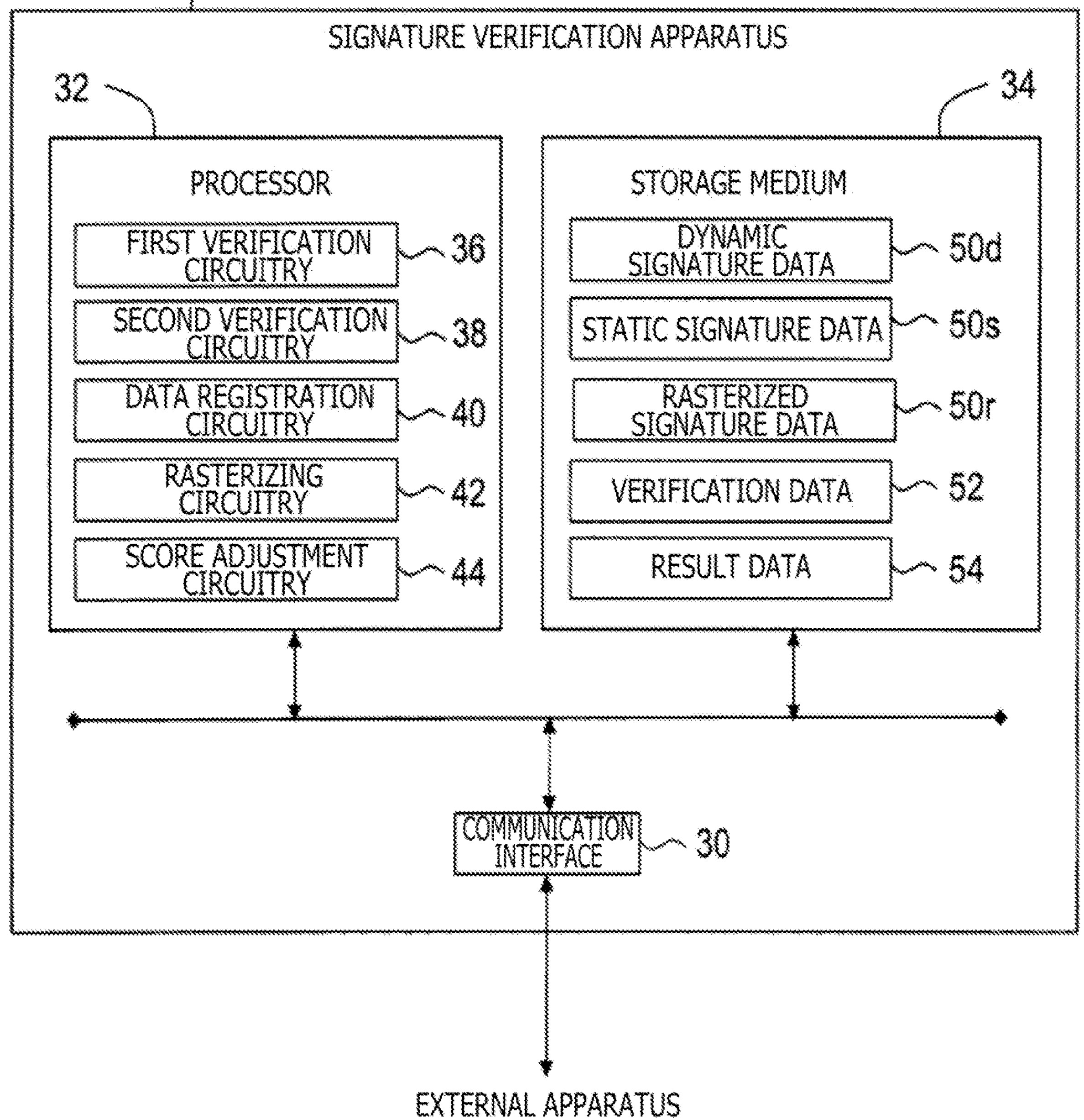
FIG. 2 is an electrical block diagram of the signature verification apparatus illustrated in FIG. 1.

FIG. 2 is an electrical block diagram of the signature verification apparatus 12 illustrated in FIG. 1. This signature verification apparatus 12 includes a communication interface 30, a processor 32, and a storage medium 34.

The communication interface 30 is a communication interface for sending and receiving electric signals to and from external apparatuses. This allows the signature verification apparatus 12 to exchange various pieces of data with the operations server 16 or the signature terminals 18 and 20 via the network NW.

The processor 32 includes an arithmetic processing apparatus that includes a central processing unit (CPU) and a micro-processing unit (MPU). The processor 32 functions, by reading out and executing programs stored in the storage medium 34, as first verification circuitry 36, second verification circuitry 38, data registration circuitry 40, a rasterizing circuitry 42, and score adjustment circuitry 44.

The storage medium 34 includes a non-transitory and computer-readable storage medium. Here, the computer-readable storage medium is a storage apparatus that includes a hard disk drive (HDD) or a solid-state drive (SSD), or a portable medium such as a magneto-optical disk, a read only memory (ROM), a compact disc read only memory (CD-ROM), or a flash memory. In the example illustrated in FIG. 2, the storage medium 34 stores dynamic signature data 50*d*, static signature data 50*s*, rasterized signature data 50*r*, verification data 52, and result data 54.

It should be noted that the dynamic signature data 50*d* is equivalent to signature data of electronic signature and may be, for example, data compliant with various formats including forensic signature store (FSS). On the other hand, the static signature data 50*s* is equivalent to part of scanned data of analog signature and may be, for example, data compliant with various formats including portable network graphics (PNG), a bitmap (BMP), the Tagged Image File Format (TIFF), and the Joint Photographic Experts Group (JPEG).

Example of the Verification Data 52

Figure 3:
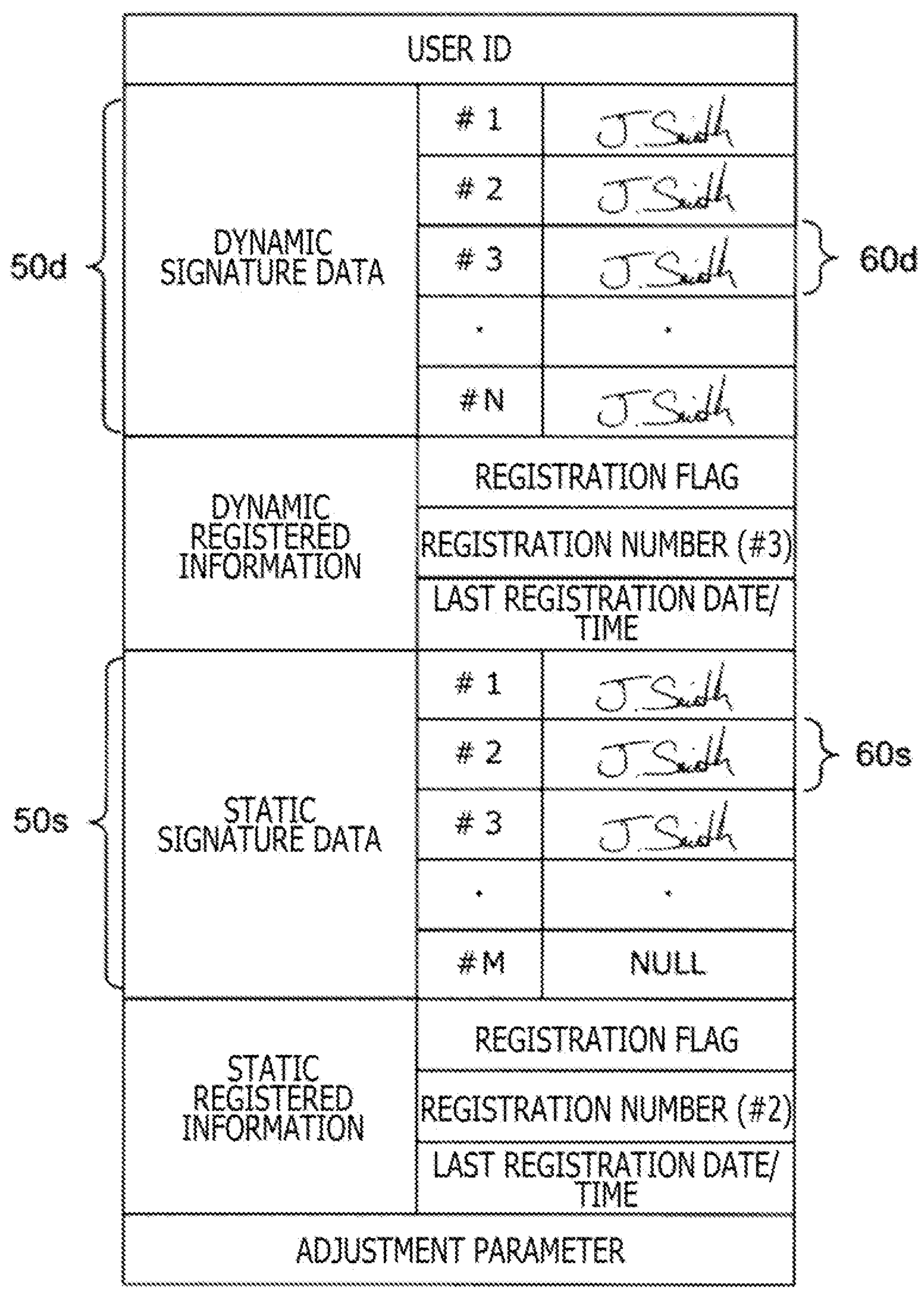
FIG. 3 is a diagram illustrating an example of a verification data structure illustrated in FIG. 2.

FIG. 3 is a diagram illustrating an example of a data structure of the verification data 52 illustrated in FIG. 2. The verification data 52 is equivalent to records of the signature DB 14 (building blocks of the database) illustrated in FIG. 1. The verification data 52 includes a user ID, the plurality of pieces of dynamic signature data 50*d*, dynamic registered information, the plurality of pieces of static signature data 50*s*, static registered information, and an adjustment parameter.

The dynamic signature data 50*d* is equivalent to a change of a user's writing state over time during signing of his or her name by the user and is acquired chronologically from the stylus 24. In other words, the dynamic signature data 50*d* is a one-dimensional array or list data that holds structure data including at least pointed positions (coordinates) in association with an order of acquisition of the structure data. This "writing state" may include not only each stroke shape (e.g., a position, a slope, and a curvature) but also a state of the stylus 24 (e.g., a pen pressure and a tilt angle). In the example illustrated in FIG. 3, up to N pieces of the dynamic signature data 50*d* can be accumulated for each user.

Dynamic registered information is information related to registration of dynamic reference data 60*d* (reference data for dynamic signature). This dynamic registered information includes a "registration flag" indicating whether or not the dynamic reference data 60*d* is registered, a "registration number" for identifying the dynamic reference data 60*d* from among the plurality of pieces of dynamic signature data 50*d*, and "last registration date/time" indicating the most recent point in time of registration.

The static signature data 50*s* is equivalent to data indicating a writing path during signing of his or her name by the user (in other words, geometric shape relating to each stroke) and does not include data such as a writing order or a pen pressure value. The static signature data 50*s* is typically image data indicating a two-dimensional array of pixel values in a rectangular region. In the example illustrated in FIG. 3, up to M pieces of the static signature data 50*s* can be accumulated for each user.

Static registered information is information related to registration of the static reference data 60*s* (reference data for static signature). This static registered information includes a "registration flag" indicating whether or not the static reference data 60*s* is registered, a "registration number" for identifying the static reference data 60*s* from among the plurality of pieces of static signature data 50*s*, and "last registration date/time" indicating the most recent point in time of registration.

An adjustment parameter is a parameter for adjusting the difference between a first score Sc1 and a second score Sc2. An example of an adjustment parameter is a weight coefficient that is multiplied by error of a state variable (e.g., a residual square value) during calculation of a link energy which will be described later.

Operation of the Signature Verification Apparatus 12

In the present embodiment, the signature verification system 10 and the signature verification apparatus 12 are configured as described above. A description will be given next of signature verification operation of the signature verification apparatus 12 with reference to FIGS. 4 to 7.

This signature verification apparatus 12 realizes a GSV capable of dealing with both the dynamic signature data 50*d* and the static signature data 50*s*. In other words, the signature verification apparatus 12 is configured to be able to carry out both (1) dynamic signature verification (DSV) using the dynamic signature data 50*d* and (2) static signature verification (SSV) using the static signature data 50*s*. A detailed description will be given below of dynamic signature verification and static signature verification with reference to the flowchart illustrated in FIG. 4 and that illustrated in FIG. 6, respectively.

DSV

Figure 4:
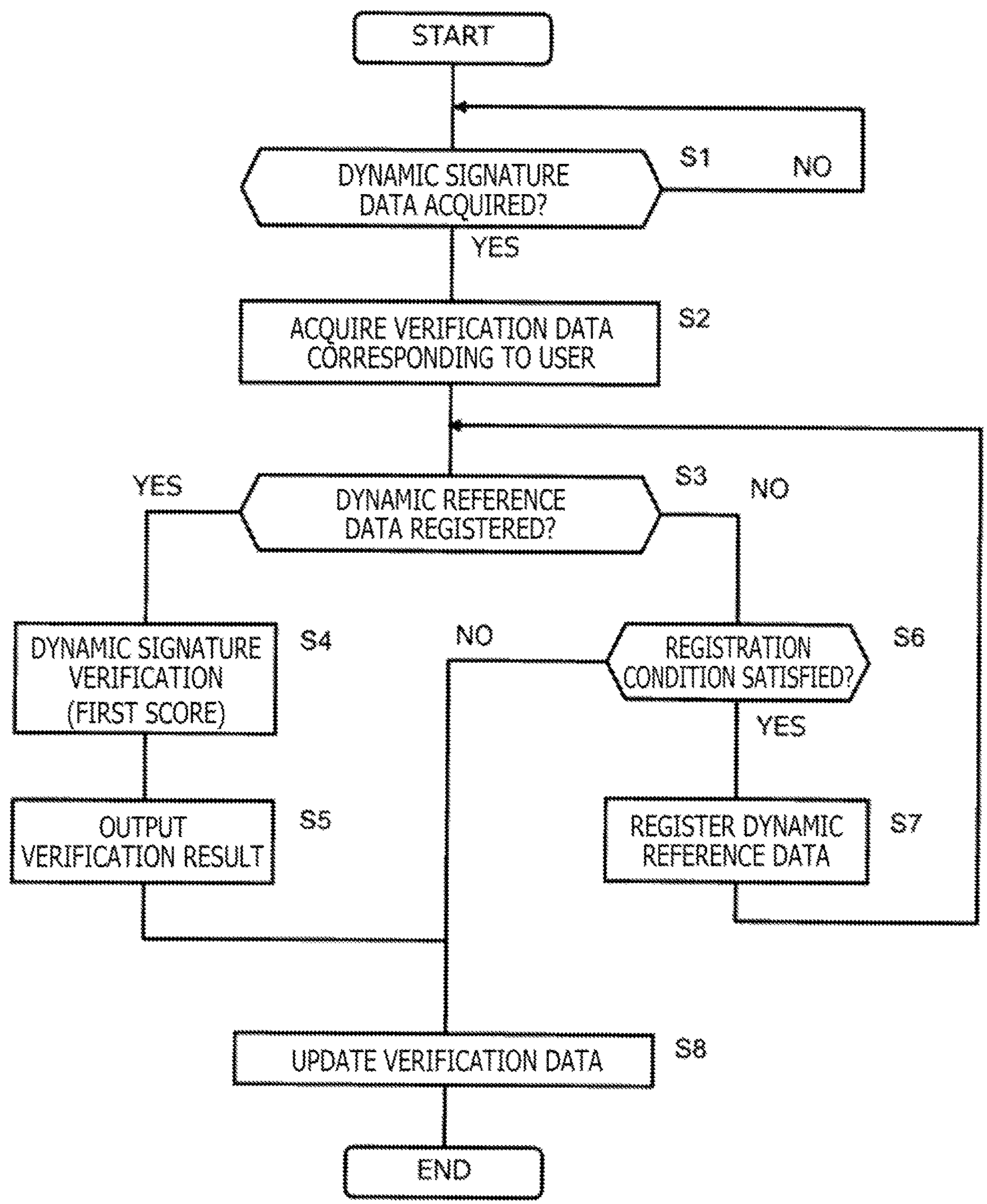
FIG. 4 is a flowchart used for describing an operation related to dynamic signature verification.

At S1 of FIG. 4, the processor 32 checks whether or not the dynamic signature data 50*d* has been acquired from the signature terminal 18. In the case where the dynamic signature data 50*d* has yet to be acquired (NO at S1), the process remains at S1 until the dynamic signature data 50*d* is acquired. On the other hand, in the case where the dynamic signature data 50*d* has been acquired (YES at S1), the process proceeds to S2.

At S2, the processor 32 identifies, by using the user ID acquired together with the dynamic signature data 50*d*, the user who signed electronically his or her name and acquires the verification data 52 corresponding to the user in question.

At S3, the first verification circuitry 36 refers to the verification data 52 (registration flag of the "dynamic registered information" in the example of FIG. 3) acquired at S2 and checks whether or not the dynamic reference data 60*d* has already been registered by the data registration circuitry 40. In the case where the dynamic reference data 60*d* has already been registered (YES at S3), the process proceeds to S4.

At S4, the first verification circuitry 36 performs dynamic signature verification by comparing the dynamic signature data 50*d* acquired at S1 and the dynamic reference data 60*d* acquired at S2. Specifically, the first verification circuitry 36 calculates the first score Sc1 indicating a degree of match between the two pieces of data. For example, the first score Sc1 is normalized within the range of [0,1] and defined such that the closer the value is to 1, the higher the degree of match, and the closer the value is to 0, the lower the degree of match.

Figure 5:
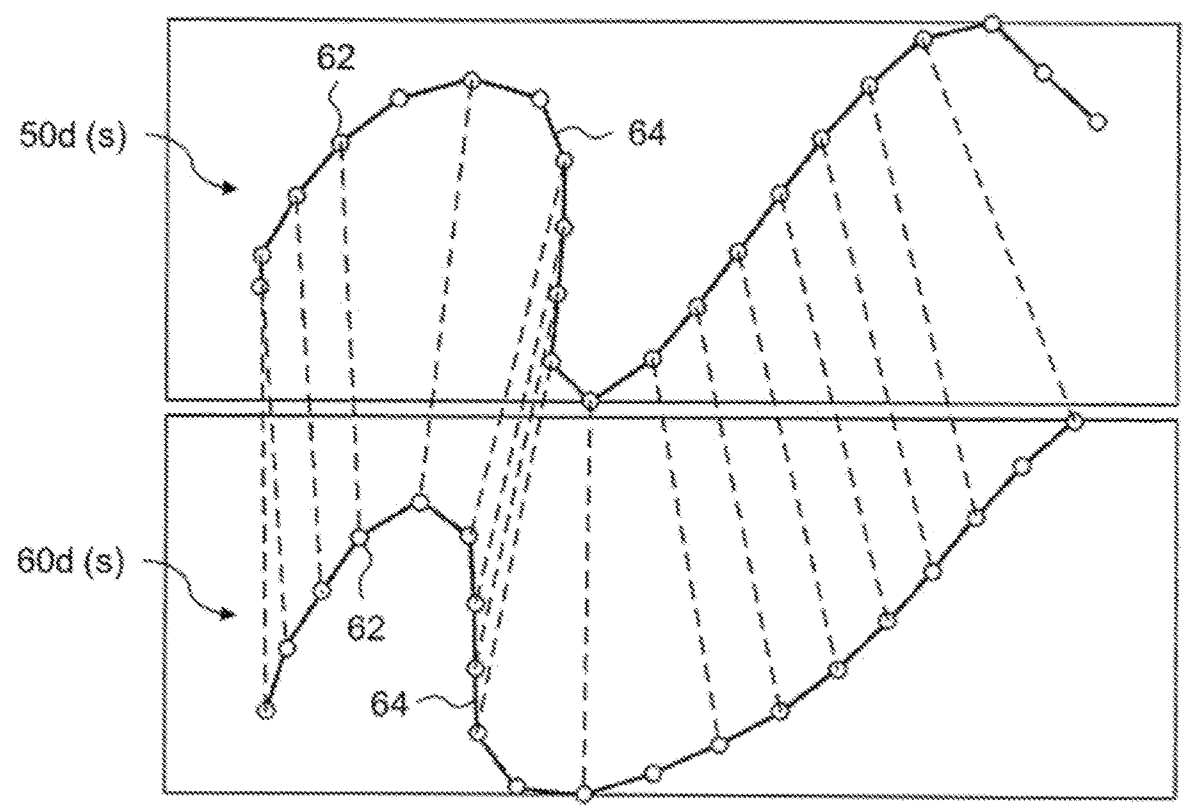
FIG. 5 is a diagram schematically illustrating a method of evaluating a degree of match between signatures.

FIG. 5 is a diagram schematically illustrating a method of evaluating the degree of match between signatures. A plurality of feature points 62 indicated by the dynamic signature data 50*d* and a stroke 64 formed by connecting the feature points 62 one after another are depicted at the top in FIG. 5. Similarly, the plurality of feature points 62 indicated by the dynamic reference data 60*d* and the stroke 64 formed by connecting the feature points 62 one after another are depicted at the bottom in FIG. 5.

The first verification circuitry 36 may calculate the first score Sc1 by using a variety of techniques including the "simulated annealing (SA) process based on link energy" disclosed in the specification of U.S. Pat. No. 9,235,748, for example. In the case of dynamic signature verification, link energy can be, for example, represented not only by a position, slope, and curvature indicating a stroke shape but also a plurality of state variables including at least one of the pen pressure and the tilt angle. As a result, the higher the ratio of the feature points 62 having similar writing states, the higher the first score Sc1, and the lower the ratio of the feature points 62 having similar writing states, the lower the first score Sc1.

At S5, the signature verification apparatus 12 externally outputs the result data 54 indicating the verification result at S4. For example, the signature terminal 18 may display a signature verification result (e.g., user information, pass/fail determination, the first score Sc1, and registration status of the dynamic reference data 60*d*) after receiving the result data 54 from the signature verification apparatus 12. Then, the process proceeds to S8 which will be described later.

Incidentally, referring back to S3 illustrated in FIG. 4, in the case where the dynamic reference data 60*d* has yet to be registered by the data registration circuitry 40 (NO at S3), the process proceeds to S6.

It should be noted that the "unregistered" state includes not only the case where a registration condition has not been satisfied even once but also the case where the temporary cancellation of the registration was triggered by the fact that a given period of time (e.g., one, three, or six months) elapsed from the most recent point in time of registration. This cancellation is effective in reducing the frequency of occurrence of false positive due to a change of the user's signature over time resulting from a physical change of the user. This is also true for S13 and S18 in FIG. 6 which will be described later.

At S6, the data registration circuitry 40 determines whether or not the registration condition of the dynamic reference data 60*d* is satisfied as a result of the new acquisition of the dynamic signature data 50*d* at S1. An example of this registration condition is that the number of samples of the dynamic signature data 50*d* of the same user exceeds a threshold (preferably a positive number equal to or larger than 3).

In the case where the registration condition of the dynamic reference data 60*d* has yet to be satisfied (NO at S6), S7 is skipped, and the process proceeds to S8. On the other hand, in the case where the registration condition of the dynamic reference data 60*d* is satisfied (YES at S6), the process proceeds to S7.

At S7, the data registration circuitry 40 selects a piece of typical data equivalent to a statistical intermediate value from among the plurality of pieces of dynamic signature data 50*d* and registers the piece of typical data as the dynamic reference data 60*d*. For example, in the case where the n pieces of dynamic signature data 50*d* are used, the data registration circuitry 40 may calculate the first scores Sc1 using all combinations of two pieces of data, one being the piece of data to be evaluated and the other being each of the remaining pieces of data and register, as the dynamic reference data 60*d*, a piece of data that provides the largest mean (or the smallest standard deviation) of the (n−1) first scores Sc1 acquired. Alternatively, the data registration circuitry 40 may ensure that, of the plurality of dynamic signature data 50*d*, the more recently a piece of data is acquired, the more likely the piece of data is selected, and the less recently a piece of data is acquired, the less likely the piece of data is selected.

Then, the process returns to S3, and the dynamic reference data 60*d* is newly registered (YES at S3), and the process proceeds to S4, S5, and S8.

At S8, the data registration circuitry 40 updates the verification data 52 in accordance with the processing results at S3 to S7. In the case where the process goes through "S5" or "NO at S6," the data registration circuitry 40 performs an updating process of adding, of the current verification data 52, the most recent dynamic signature data 50*d* acquired at S1. In the case where the process goes through "S7," the data registration circuitry 40 performs an updating process of adding, of the current verification data 52, the most recent dynamic signature data 50*d* and changing the contents of dynamic registered information.

As described above, the signature verification apparatus 12 can verify the dynamic signature data 50*d* input from the signature terminal 18 (i.e., carry out dynamic signature verification) by performing the acts depicted in the flowchart of FIG. 4 one after another.

SSV

Figure 6:
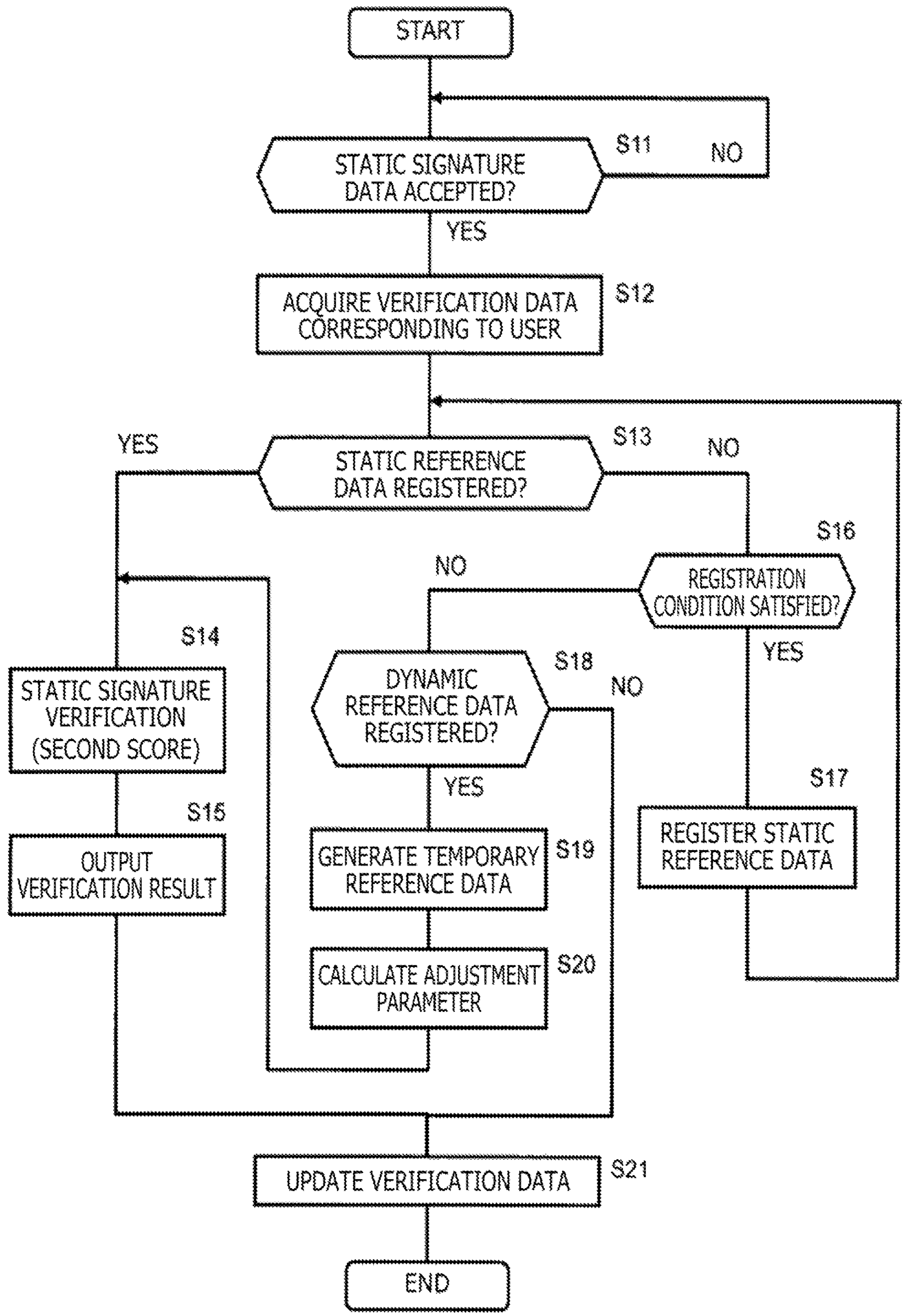
FIG. 6 is a flowchart used for describing an operation related to static signature verification.

At S11 of FIG. 6, the processor 32 checks whether or not the static signature data 50*s* has been acquired from the signature terminal 20. In the case where the static signature data 50*s* has yet to acquired (NO at S11), the process remains at S11 until the static signature data 50*s* is acquired. On the other hand, in the case where the static signature data 50*s* has been acquired (YES at S11), the process proceeds to S12.

At S12, the processor 32 identifies, by using the user ID acquired together with the static signature data 50*s*, the user who signed in analog form his or her name and acquires the verification data 52 corresponding to the user in question.

At S13, the second verification circuitry 38 refers to the verification data 52 (registration flag of the "static registered information" in the example of FIG. 3) acquired at S12 and checks whether or not the static reference data 60*s* has already been registered. In the case where the static reference data 60*s* has already been registered (YES at S13), the process proceeds to S14.

At S14, the second verification circuitry 38 performs static signature verification by comparing the static signature data 50*s* acquired at S11 and the static reference data 60*s* acquired at S12. Specifically, the second verification circuitry 38 calculates the second score Sc2 indicating a degree of match between the two pieces of data. Here, the second score Sc2 is normalized within the range of [0,1], as the case of the first score Sc1, and defined such that the closer the value is to 1, the higher the degree of match, and the closer the value is to 0, the lower the degree of match.

Referring back to FIG. 5, the stroke 64 indicated by the static signature data 50*s* and the stroke 64 indicated by the static reference data 60*s* are depicted at the top and bottom in FIG. 5, respectively. The second verification circuitry 38 performs a process of determining the plurality of feature points 62 on the stroke 64 before calculating the second scores Sc2. For example, the second verification circuitry 38 may extract a feature line (e.g., outline or center line) indicating a feature of the stroke 64, approximate the feature line by using a plurality of line elements made up of specific functional shapes (e.g., arcs and polynomials), and determine connecting points of the line elements (start and end points) as the feature points 62.

Then, the second verification circuitry 38 may calculate the second score Sc2 by using the same techniques as for the first score Sc1 by changing the definition of link energy. In the case of static signature verification, link energy can be represented, for example, by using a plurality of state variables including position, slope, and curvature indicating the shape of a feature line. As a result, the higher the ratio of the feature points 62 having similar stroke shapes, the higher the second score Sc2, and the lower the ratio of the feature points 62 having similar stroke shapes, the lower the second score Sc2.

At S15, the signature verification apparatus 12 externally outputs the result data 54 indicating the verification result at S14. For example, the signature terminal 20 may display a signature verification result (e.g., user information, pass/fail determination, the second score Sc2 and registration status of the static reference data 60*s*) after receiving the result data 54 from the signature verification apparatus 12. Then, the process proceeds to S21 which will be described later.

Incidentally, referring back to S13 illustrated in FIG. 6, in the case where the static reference data 60*s* has yet to be registered by the data registration circuitry 40 (NO at S13), the process proceeds to S16.

At S16, the data registration circuitry 40 determines whether or not the registration condition of the static reference data 60*s* is satisfied as a result of the new acquisition of the static signature data 50*s* at S11. An example of this registration condition is that the number of samples of the static signature data 50*s* of the same user exceeds a threshold (preferably a positive number equal to or larger than 3).

In the case where the registration condition of the static reference data 60*s* has yet to be satisfied (NO at S16), S17 is skipped, and the process proceeds to S21 which will be described later. On the other hand, in the case where the registration condition of the static reference data 60*s* is satisfied (YES at S16), the process proceeds to S17.

At S17, the data registration circuitry 40 selects a piece of typical data equivalent to a statistical intermediate value from among the plurality of pieces of static signature data 50*s* and registers the piece of typical data as the static reference data 60*s*. For example, in the case where the m pieces of static signature data 50*s* are used, the data registration circuitry 40 may calculate the second scores Sc2 using all combinations of two pieces of data, one being the piece of data to be evaluated and the other being each of the remaining pieces of data and register, as the static reference data 60*s*, a piece of data that provides the largest mean (or the smallest standard deviation) of the (m−1) second scores Sc2 acquired. Alternatively, the data registration circuitry 40 may preferentially register, of the plurality of static signature data 50*s*, the most recently acquired data as the static reference data 60*s*.

Then, the process returns to S13, and the static reference data 60*s* is newly registered (YES at S13), and the process proceeds to S14, S15, and S21 in this order.

Incidentally, referring back to S16 illustrated in FIG. 6, in the case where the registration condition of the static reference data 60*s* is not satisfied (NO at S16), the process proceeds to S18.

At S18, the second verification circuitry 38 refers to the verification data 52 (registration flag of the "dynamic registered information" in the example of FIG. 3) acquired at S12 and checks whether or not the dynamic reference data 60*d* has already been registered by the data registration circuitry 40. In the case where the dynamic reference data 60*d* has yet to be registered (NO at S18), the process proceeds to S21 which will be described later. On the other hand, in the case where the dynamic reference data 60*d* has already been registered (YES at S18), the process proceeds to S19.

At S19, the rasterizing circuitry 42 generates temporary reference data 60*r* in the same data format as the static reference data 60*s* by rasterizing the dynamic reference data 60*d* whose registration was confirmed at S18. At S20, the score adjustment circuitry 44 calculates an adjustment parameter for adjusting the score between the first score Sc1 and the second score Sc2 by using at least the temporary reference data 60*r*. A detailed description will be given below of a method of calculating the adjustment parameter with reference to FIG. 7.

Figure 7:
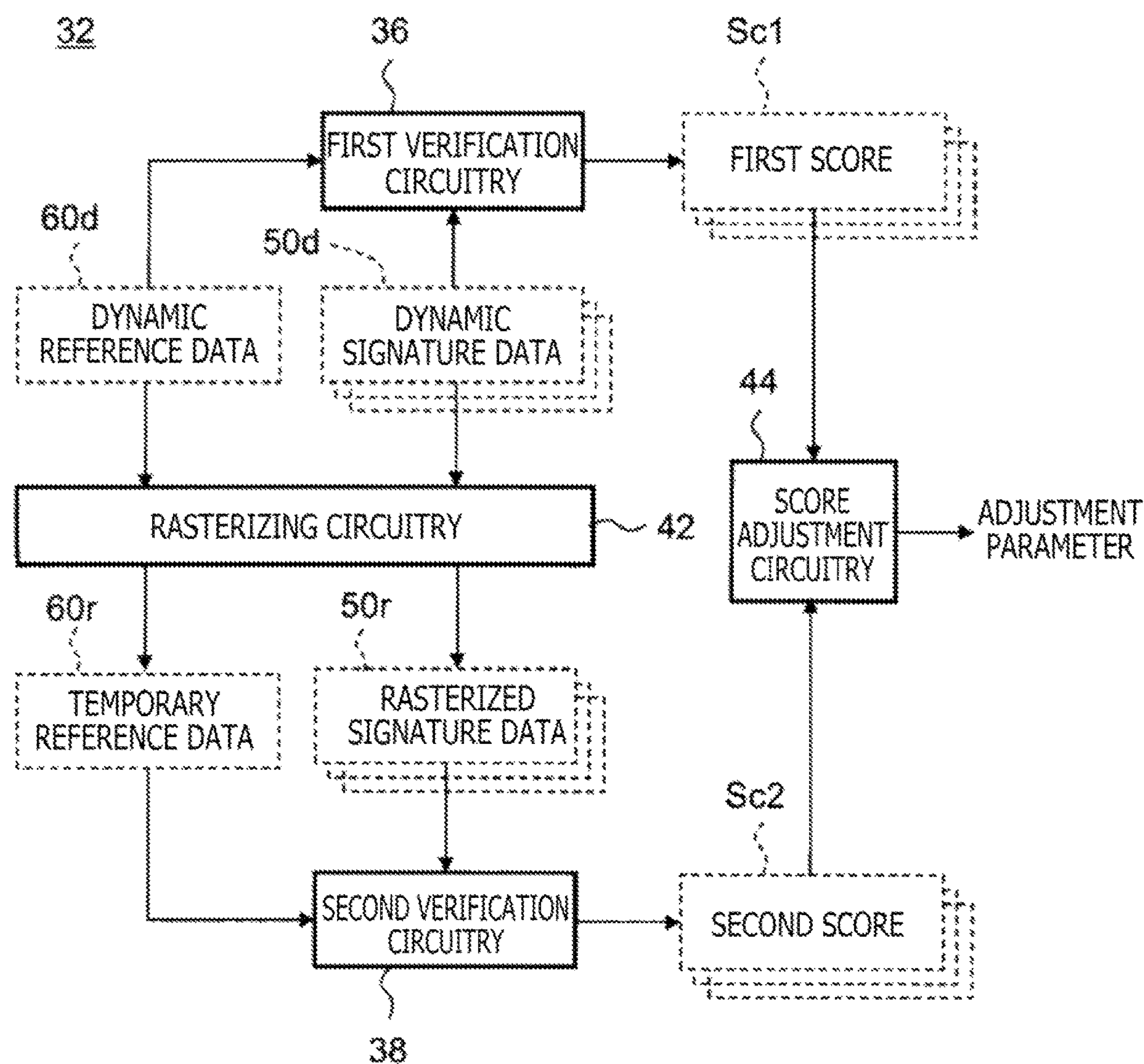
FIG. 7 is a diagram schematically illustrating a method of calculating an adjustment parameter at S20 of FIG. 6.

(1) First, the plurality of pieces of dynamic signature data 50*d* collected from the same user are prepared as illustrated in FIG. 7. Then, the first verification circuitry 36 calculates the plurality of first scores Sc1 by comparing the dynamic signature data 50*d* and the dynamic reference data 60*d*.

(2) Next, the rasterizing circuitry 42 generates the temporary reference data 60*r* by rasterizing the dynamic reference data 60*d*. Similarly, the rasterizing circuitry 42 generates a plurality of pieces of rasterized signature data 50*r* by rasterizing the plurality of pieces of dynamic signature data 50*d*.

(3) Next, the second verification circuitry 38 calculates the plurality of second scores Sc2 by comparing the rasterized signature data 50*r* and the temporary reference data 60*r*. In other words, the second scores Sc2 corresponding in number to samples of the dynamic signature data 50*d* are calculated.

(4) Finally, the score adjustment circuitry 44 calculates the adjustment parameter (e.g., correction amount of weight coefficient) in such a manner as to bring the two scores closer to each other on the basis of a relationship between a plurality of sets of scores (Sc1 and Sc2). Specifically, in the case where the difference between the two scores is large due to a pen pressure, the contribution of the pen pressure to the link energy may be reduced by finding a correction amount that relatively reduces the weight coefficient corresponding to the pen pressure.

Following S20, the second verification circuitry 38 calculates the second score Sc2, a score adjusted with the adjustment parameter, by performing comparison using the temporary reference data 60*r* in place of the static reference data 60*s* that has yet to be registered (S14). Then, the process goes through verification result output (S15) and proceeds to S21.

At S21, the data registration circuitry 40 updates the verification data 52 in accordance with the processing results in S13 to S20. In the case where the process goes through "YES at S13" or "NO at S18," the data registration circuitry 40 performs an updating process of adding, of the current verification data 52, the most recent static signature data 50*s* acquired at S11. In the case where the process goes through "YES at S18," the data registration circuitry 40 performs an updating process of adding, of the current verification data 52, the most recent static signature data 50*s* and changing the adjustment parameter. In the case where the process goes through "S17," the data registration circuitry 40 performs an updating process of adding, of the current verification data 52, the most recent static signature data 50*s* and changing the contents of static registered information.

As described above, the signature verification apparatus 12 can verify the static signature data 50*s* input from the signature terminal 20 (i.e., carry out static signature verification) by performing the acts depicted in the flowchart of FIG. 6 one after another.

Effect of the Present Embodiment

As described above, the signature verification apparatus 12 includes the first verification circuitry 36, the second verification circuitry 38, and the data registration circuitry 40. The first verification circuitry 36 verifies a user's signature by comparing the dynamic signature data 50*d* indicating a change of a user's writing state over time during signing of his or her name by the user and the dynamic reference data 60*d*. The second verification circuitry 38 verifies the user's signature by comparing the static signature data 50*s* indicating a writing path during signing of his or her name by the user and the static reference data 60*s*. The data registration circuitry 40 registers the dynamic reference data 60*d* on the basis of the plurality of pieces of dynamic signature data 50*d* acquired from the same user and registers the static reference data 60*s* on the basis of the plurality of pieces of static signature data 50*s* acquired from the same user. In the case where the static reference data 60*s* has yet to be registered, the second verification circuitry 38 verifies the user's signature by regarding the temporary reference data 60*r*, generated from the dynamic reference data 60*d* already registered, as the static reference data 60*s*.

Also, the signature verification system 10 includes the signature verification apparatus 12 and the one or plurality of signature terminals 18 and 20 configured to permit input of the dynamic signature data 50*d* or the static signature data 50*s* in association with the user who signs his or her name.

Also, the signature verification method and the signature verification program use one or a plurality of computers to perform the first verification (S4 in FIG. 4), the second verification (S14 in FIG. 6), and the data registration (S7 in FIG. 4 and S17 in FIG. 6). The first verification verifies a user's signature by comparing the dynamic signature data 50*d* and the dynamic reference data 60*d*. The second verification verifies the user's signature by comparing the static signature data 50*s* and the static reference data 60*s*. The data registration registers the dynamic reference data 60*d* on the basis of the plurality of pieces of dynamic signature data 50*d* acquired from the same user and registers the static reference data 60*s* on the basis of the plurality of pieces of static signature data 50*s* acquired from the same user. In the case where the static reference data 60*s* has yet to be registered, the second verification (S14 in FIG. 6) verifies the user's signature by regarding the temporary reference data 60*r*, generated from the dynamic reference data 60*d* already registered, as the static reference data 60*s*.

Such a configuration allows to complement the unregistered static reference data 60*s* by using the dynamic reference data 60*d*, data already registered on the basis of the plurality of pieces of dynamic signature data 50*d* acquired from the same user and data highly reliable as a verification criterion, thus making it possible to perform a highly accurate verification process on the static signature data 50*s* even in the state in which the unregistered static reference data 60*s* has yet to be registered.

Also, in the case where the static reference data 60*s* is newly registered in the state in which the dynamic reference data 60*d* has already been registered, the second verification circuitry 38 may verify the user's signature by using the newly registered static reference data 60*s* in place of the temporary reference data 60*r*. This allows two types of verification processes to be performed independently of each other without being affected by reference data of the two verification processes.

Also, in the case where a given period of time elapses from the most recent point in time of registration, the data registration circuitry 40 may cancel the registration of the dynamic reference data 60*d* or the static reference data 60*s*. In this case, there is extra time from cancellation of the registration to re-registration, thus allowing the above complementing effect to manifest itself in a more noticeable manner.

Also, the first verification circuitry 36 verifies the user's signature by calculating the first score Sc1 indicating a degree of match with the dynamic reference data 60*d*. The second verification circuitry 38 verifies the user's signature by calculating the second score Sc2 indicating the degree of match with the static reference data 60*s*. The signature verification apparatus 12 may further include the score adjustment circuitry 44 that adjusts the scores such that the difference between the first score Sc1 and the second score Sc2 calculated on the basis of the same dynamic signature data 50*d* diminishes. This ensures higher consistency between results of the two types of verification processes.

REMARKS

It should be noted that, in the above embodiment, in the case where the static reference data 60*s* has yet to be registered by the data registration circuitry 40, the signature is verified by using the temporary reference data 60*r*. However, an opposite case may occur. In other words, in the case where the dynamic reference data 60*d* has yet to be registered by the data registration circuitry 40, the first verification circuitry 36 may verify the signature by regarding temporary reference data, generated from the static reference data 60*s* already registered, as the dynamic reference data 60*d*.

It is to be noted that the embodiment of the present disclosure is not limited to the foregoing embodiment, and that various changes can be made without departing from the spirit of the present disclosure. For instance, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A signature verification apparatus, comprising:

first verification circuitry configured to verify a user's signature by comparing dynamic signature data indicating a change of a user's writing state over time by the user and reference data for dynamic signature;

second verification circuitry configured to verify the user's signature by comparing static signature data indicating a writing path by the user and reference data for static signature; and data registration circuitry configured to register the reference data for dynamic signature based on dynamic signature data corresponding to the user and register the reference data for static signature based on static signature data corresponding to the user, wherein when the reference data for static signature is not registered, the second verification circuitry is configured to verify the user's signature by using static signature data generated from the reference data, wherein when the reference data for static signature is registered, the second verification circuitry verifies the user's signature by the reference data for static signature, and wherein when the reference data for static signature is newly registered in a state in which the reference data for dynamic signature has already been registered, the second verification circuitry verifies the user's signature by using the newly registered reference data for static signature in place of the static signature data generated from the reference data for dynamic signature.

2. The signature verification apparatus of claim 1, wherein when the reference data for static signature is not registered, the second verification circuitry is configured to verify the user's signature by using static signature data generated from the reference data for dynamic signature already registered as the reference data for static signature.

3. The signature verification apparatus of claim 1, wherein when a given period of time elapses from a most recent point in time of registration, the data registration circuitry cancels the registration of the reference data for dynamic signature or the reference data for static signature.

4. A signature verification system, comprising:

the signature verification apparatus of claim 1; and one or a plurality of signature terminals configured to permit input of the dynamic signature data or the static signature data in association with the user who signs his or her name.

5. The signature verification apparatus of claim 4, wherein when a given period of time elapses from a most recent point in time of registration, the data registration circuitry cancels the registration of the reference data for dynamic signature or the reference data for static signature.

6. A signature verification apparatus, comprising:

first verification circuitry configured to verify a user's signature by comparing dynamic signature data indicating a change of a user's writing state over time by the user and reference data for dynamic signature;

second verification circuitry configured to verify the user's signature by comparing static signature data indicating a writing path by the user and reference data for static signature;

data registration circuitry configured to register the reference data for dynamic signature based on dynamic signature data corresponding to the user and register the reference data for static signature based on static signature data corresponding to the user, wherein when the reference data for static signature is not registered, the second verification circuitry is configured to verify the user's signature by static signature data generated from the reference data, wherein the first verification circuitry is configured to verify the user's signature by calculating a first score indicating a degree of match with the reference data for dynamic signature, and wherein the second verification circuitry is configured to verify the user's signature by calculating a second score indicating a degree of match with the reference data for static signature, and score adjustment circuitry configured to adjust the first and second scores such that a difference between the first score and the second score calculated based on a same dynamic signature data diminishes.

7. A signature verification method using one or a plurality of computers, comprising:

verifying a user's signature by comparing dynamic signature data indicating a change of a user's writing state over time by the user and reference data for dynamic signature;

verifying the user's signature by comparing static signature data indicating a writing path by the user and reference data for static signature; and registering the reference data for dynamic signature based on dynamic signature data corresponding to the user and registering the reference data for static signature based on static signature data corresponding to the user, wherein when the reference data for static signature is not registered, the verifying the user's signature by comparing the static signature data indicating the writing path by the user and the reference data for static signature comprises verifying the user's signature by static signature data generated from the reference data, wherein when the reference data for static signature is registered, in the verifying the user's signature by comparing the static signature data indicating the writing path by the user and the reference data for static signature, the user's signature is verified by the reference data for static signature, and wherein when the reference data for static signature is newly registered in a state in which the reference data for dynamic signature has already been registered, in the verifying the user's signature by comparing the static signature data indicating the writing path by the user and the reference data for static signature, the user's signature is verified by using the newly registered reference data for static signature in place of the static signature data generated from the reference data for dynamic signature.

8. The signature verification method of claim 7, wherein when the reference data for static signature is not registered, the verifying the user's signature by comparing the static signature data indicating the writing path by the user and the reference data for static signature comprises verifying the user's signature by using static signature data generated from the reference data for dynamic signature already registered as the reference data for static signature.

9. The signature verification method of claim 7, wherein when a given period of time elapses from a most recent point in time of registration, in the registering, the registration of the reference data for dynamic signature or the reference data for static signature is cancelled.

10. A signature verification method using one or a plurality of computers, comprising:

verifying a user's signature by comparing dynamic signature data indicating a change of a user's writing state over time by the user and reference data for dynamic signature;

verifying the user's signature by comparing static signature data indicating a writing path by the user and reference data for static signature;

registering the reference data for dynamic signature based on a plurality of pieces of dynamic signature data acquired from the user and registering the reference data for static signature based on static signature data corresponding to the user, wherein when the reference data for static signature is not registered, the verifying the user's signature by comparing the static signature data indicating the writing path during the signing by the user and the reference data for static signature comprises verifying the user's signature by static signature data generated from the reference data, wherein in the verifying the user's signature by comparing the dynamic signature data indicating the change of the user's writing state over time and the reference data for dynamic signature, the user's signature being verified by calculating a first score indicating a degree of match with the reference data for dynamic signature, and wherein in the verifying the user's signature by comparing the static signature data indicating the writing path by the user and the reference data for static signature, the user's signature being verified by calculating a second score indicating the degree of match with the reference data for static signature, and adjusting the first and second scores such that a difference between the first score and the second score calculated based on a same dynamic signature data diminishes.

11. A nontransitory processor-readable storage medium that stores instructions, the at least one nontransitory processor-readable storage medium, when executed by at least one processor, causes the at least one processor to:

verify a user's signature by comparing dynamic signature data indicating a change of a user's writing state over time by the user and reference data for dynamic signature;

verify the user's signature by comparing static signature data indicating a writing path the user and reference data for static signature; and register the reference data for dynamic signature based on dynamic signature data corresponding to the user and registering the reference data for static signature based on static signature data corresponding to the user, wherein when the reference data for static signature is not registered, verify the user's signature comprises use static signature data generated from the reference data, wherein when the reference data for static signature is registered, verify the user's signature comprises use the reference data for static signature, and wherein when the reference data for static signature is newly registered in a state in which the reference data for dynamic signature has already been registered, verify the user's signature comprises using the newly registered reference data for static signature in place of the static signature data generated from the reference data for dynamic signature.

12. The nontransitory processor-readable storage medium of claim 11, wherein when the reference data for static signature is not registered, verify the user's signature comprises using static signature data generated from the reference data for dynamic signature already registered as the reference data for static signature.

* * * * *